US010638204B2

(12) United States Patent
Garg

(10) Patent No.: US 10,638,204 B2
(45) Date of Patent: *Apr. 28, 2020

(54) DELIVERY OF CONTENT AND PRIORITY MESSAGES

(71) Applicant: Comcast Cable Communications, LLC, Philadelphia, PA (US)

(72) Inventor: Amit Garg, Delran, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,447

(22) Filed: Jun. 7, 2019

(65) Prior Publication Data
US 2019/0297389 A1  Sep. 26, 2019

Related U.S. Application Data

(63) Continuation of application No. 13/803,348, filed on Mar. 14, 2013, now Pat. No. 10,368,142.

(51) Int. Cl.
*H04N 21/81* (2011.01)
*H04N 21/258* (2011.01)
*H04N 21/433* (2011.01)
*H04N 21/6543* (2011.01)

(52) U.S. Cl.
CPC ..... *H04N 21/814* (2013.01); *H04N 21/25883* (2013.01); *H04N 21/4333* (2013.01); *H04N 21/6543* (2013.01)

(58) Field of Classification Search
CPC .......... H04N 21/814; H04N 21/25883; H04N 21/4333; H04N 21/6543; H04N 21/435; H04N 21/235; G08B 27/00; G08B 27/008; H04H 20/59
See application file for complete search history.

(56) References Cited

U.S. PATENT DOCUMENTS

| 7,925,771 | B1 * | 4/2011 | Ping | H04L 65/4092 709/203 |
| 8,006,275 | B1 * | 8/2011 | Poole | H04N 7/17318 725/14 |
| 8,607,266 | B2 * | 12/2013 | Wendling | H04N 5/4401 725/32 |
| 2002/0078441 | A1 | 6/2002 | Drake et al. | |
| 2002/0194592 | A1 | 12/2002 | Tsuchida et al. | |
| 2002/0194593 | A1 | 12/2002 | Tsuchida et al. | |
| 2004/0255139 | A1 | 12/2004 | Giobbi | |
| 2005/0005303 | A1 | 1/2005 | Barone et al. | |

(Continued)

Primary Examiner — Alexander Gee
(74) Attorney, Agent, or Firm — Banner & Witcoff, Ltd.

(57) ABSTRACT

Herein described are at least a system, computer readable storage media, and method for resuming consumption of content which was interrupted by a high priority message. In one embodiment, the method includes receiving the message while tuned to a first communications channel for receiving content, and transmitting a first signal responsive to detecting the start of the message. The first signal may pause delivery of the content, and may determine a location in the content corresponding to the start of the message. The method may further transmit a second signal responsive to detecting an end of the message, and trigger a resumption of delivery of the content starting at the indexed location.

20 Claims, 6 Drawing Sheets

(56) References Cited

U.S. PATENT DOCUMENTS

| | | | |
|---|---|---|---|
| 2006/0005219 A1* | 1/2006 | Owens | G08B 27/008 |
| | | | 725/33 |
| 2010/0162299 A1* | 6/2010 | Downey | G08B 27/008 |
| | | | 725/33 |
| 2011/0093885 A1 | 4/2011 | Ravula | |
| 2011/0197223 A1 | 8/2011 | Ravula | |
| 2011/0258678 A1* | 10/2011 | Cowling | H04W 16/16 |
| | | | 725/125 |
| 2012/0159533 A1 | 6/2012 | Reddy et al. | |
| 2013/0247094 A1* | 9/2013 | Hardin | H04N 21/2385 |
| | | | 725/33 |

* cited by examiner

DELIVERY OF CONTENT AND PRIORITY MESSAGES

CROSS-REFERENCE TO RELATED APPLICATION

This application is a continuation of and claims priority to U.S. patent application Ser. No. 13/803,348, filed Mar. 14, 2013, which is incorporated herein by reference in its entirety.

BACKGROUND

When an emergency alert system (EAS) message is transmitted to a viewer consuming media content, such as a television program, the viewer must wait until the EAS message is completely delivered before he can continue watching the television program. When the content is delivered by a content provider, the program may automatically resume after the EAS message ends, enabling the viewer to continue watching the content at the point where the interruption occurred.

When the content is a time-shifted content, such as a video on demand (VOD) program or other non-linear program, an interruption caused by an EAS message may require the viewer to reselect the previously watched program. Furthermore, if the viewer had watched a substantial portion of the program, the viewer may need to manipulate the program to locate the point at which the interruption occurred.

In some systems, one or more request messages may be generated by the user terminal to tune in to the previously viewed program after completion of the EAS message, but such messages may result in instability to the user terminal and content delivery systems. As such, improvements are needed to address the foregoing and other related shortcomings.

SUMMARY

In light of the foregoing background, and other shortcomings, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

According to some embodiments, a system provides a method for resuming playback of content which was interrupted by a high priority communication, such as a communication initiated by an emergency alert system (EAS). The method may include receiving the high priority communication while tuned to a first communication channel, which may be receiving content transmitted by a content server, and transmitting a signal responsive to detecting the start of the high priority communication message. In an aspect, the first signal may pause delivery of the content and may index or otherwise note a location in the content corresponding to the start of the high priority communication message. The method may further include transmitting a second signal responsive to detecting an end of the high priority communication message, wherein the second signal triggers a resumption of delivery of the content starting at the indexed location.

The various aspects of the illustrative embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

Figure 1:
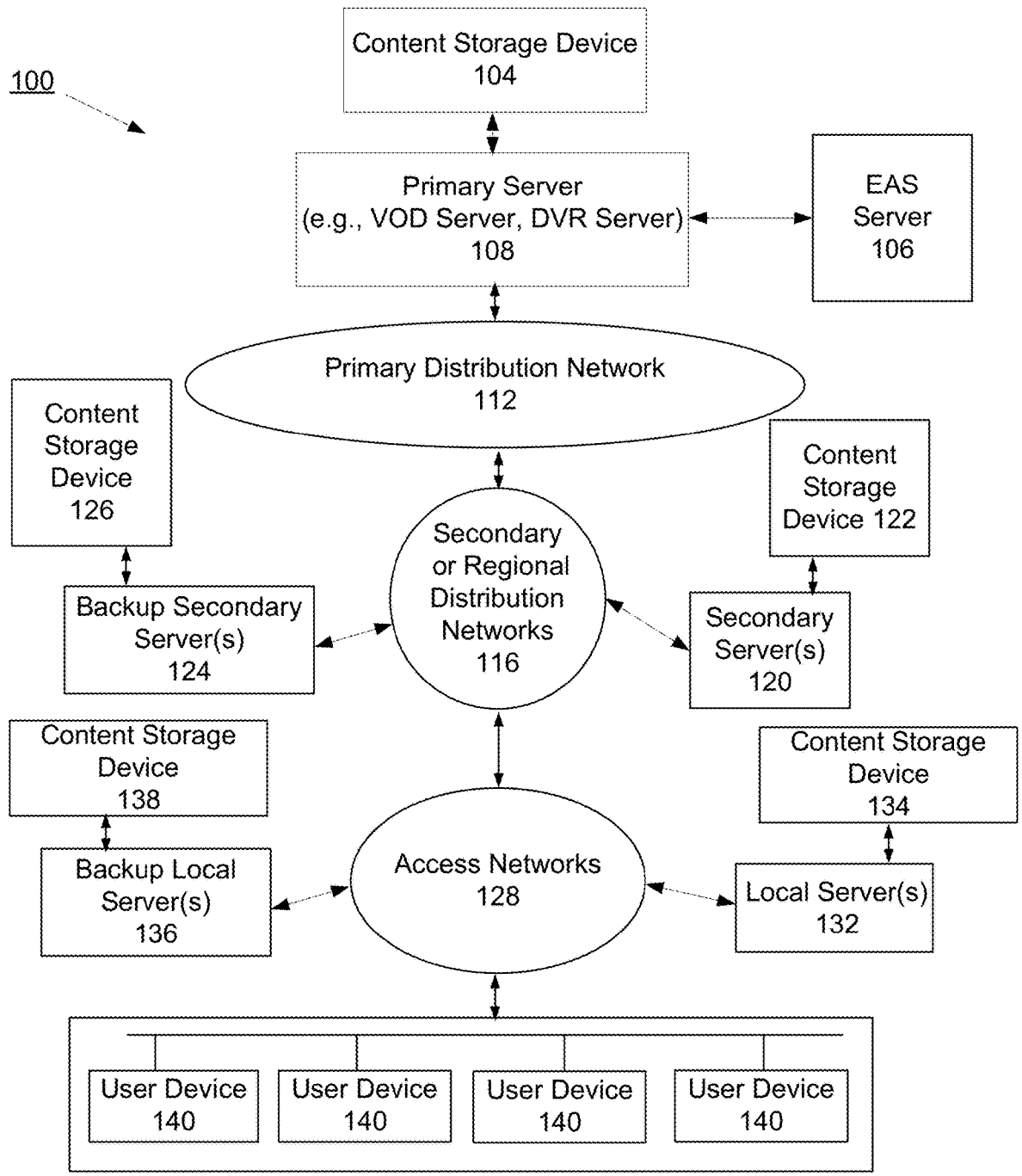

Having thus described aspects of the disclosure in general terms, reference will now be made to the accompanying drawings, which are not necessarily drawn to scale, and wherein:

FIG. 1 illustrates an example content access or delivery system in which various embodiments may be implemented.

Figure 2:
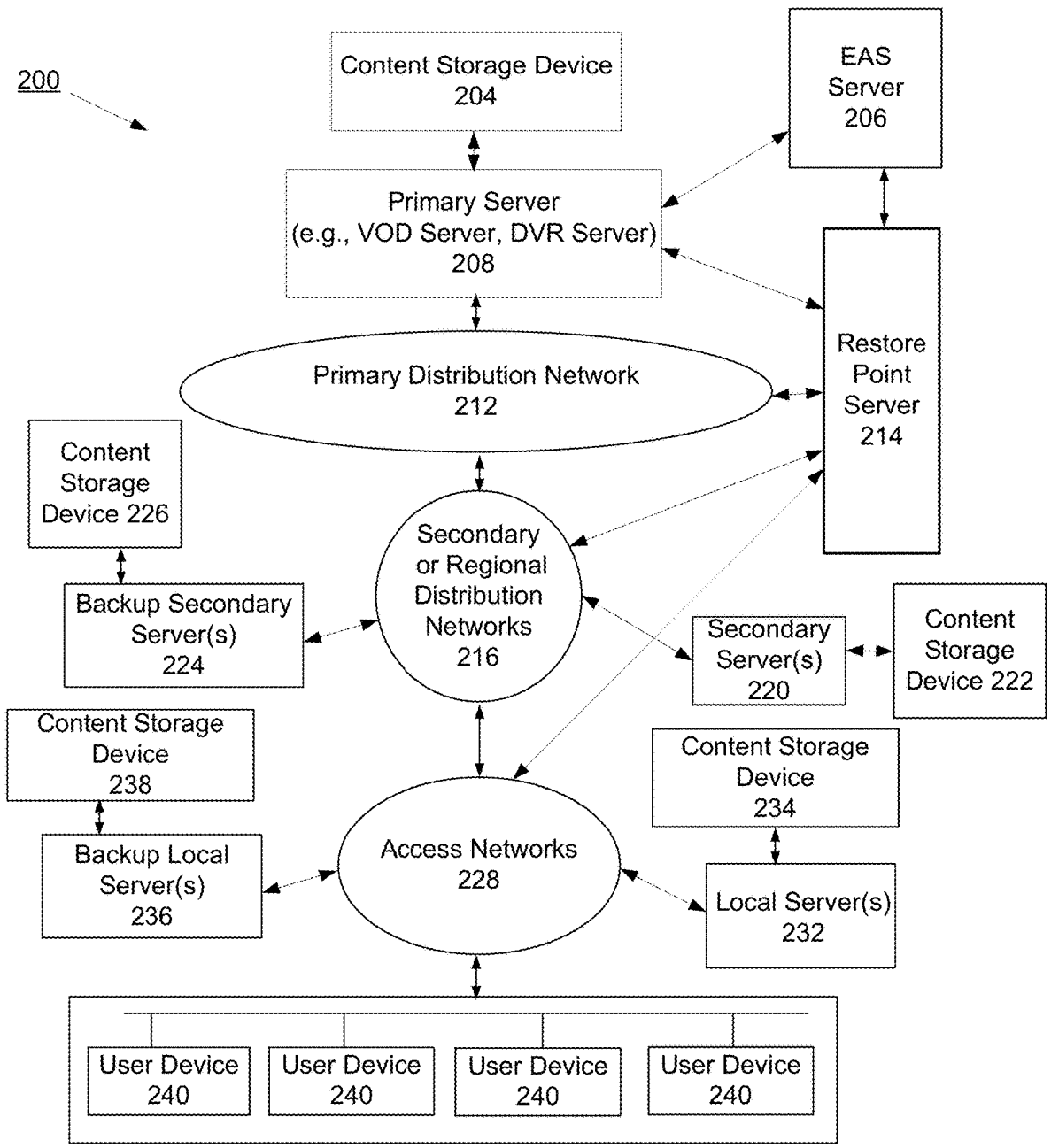

FIG. 2 is an example content delivery system in which various embodiments may be implemented.

Figure 3:
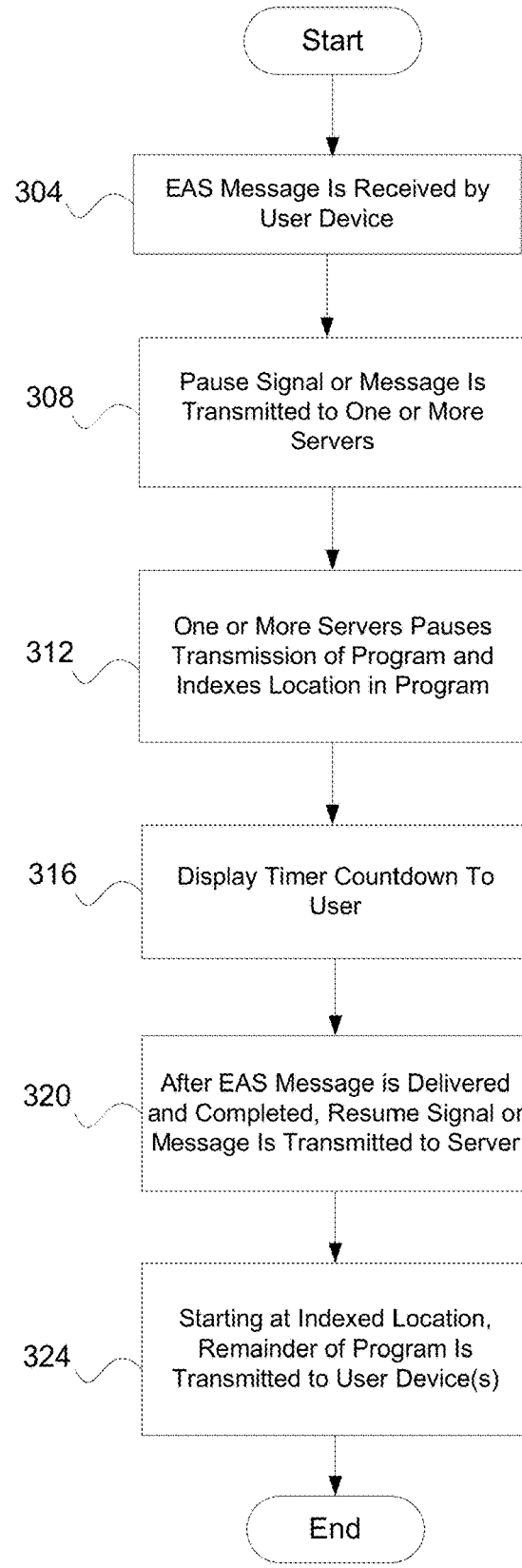

FIG. 3 is an example flow diagram of a method in accordance with various embodiments.

Figure 4:
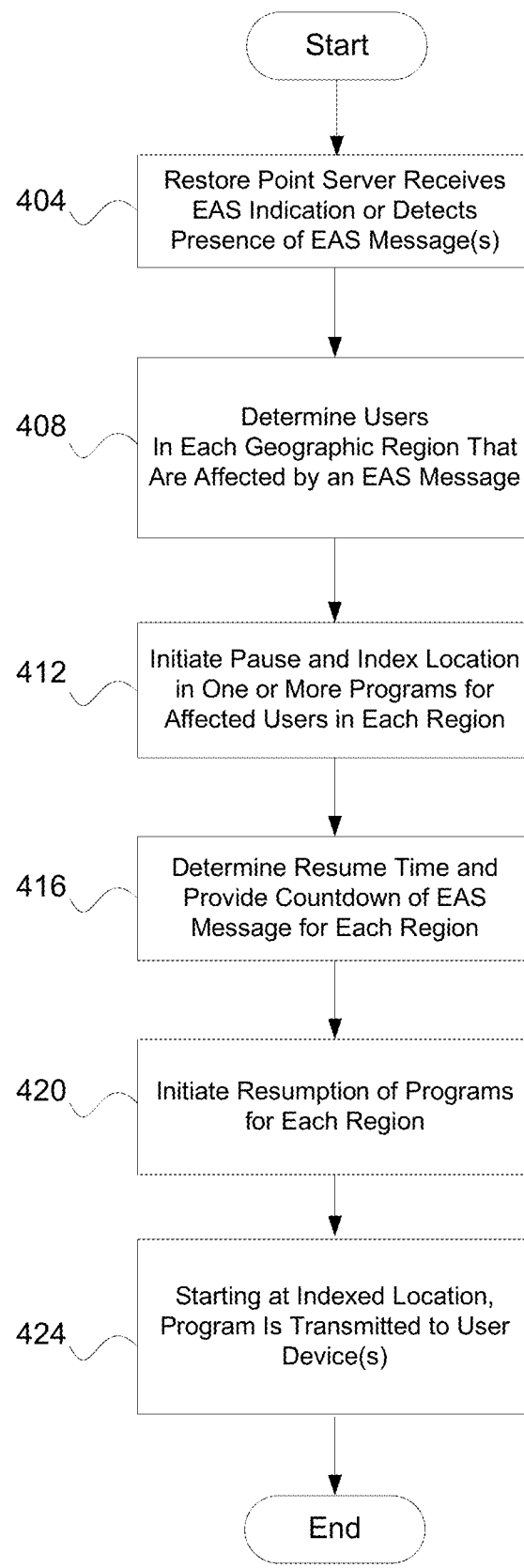

FIG. 4 is an example flow diagram of a method in accordance with various embodiments.

Figure 5:
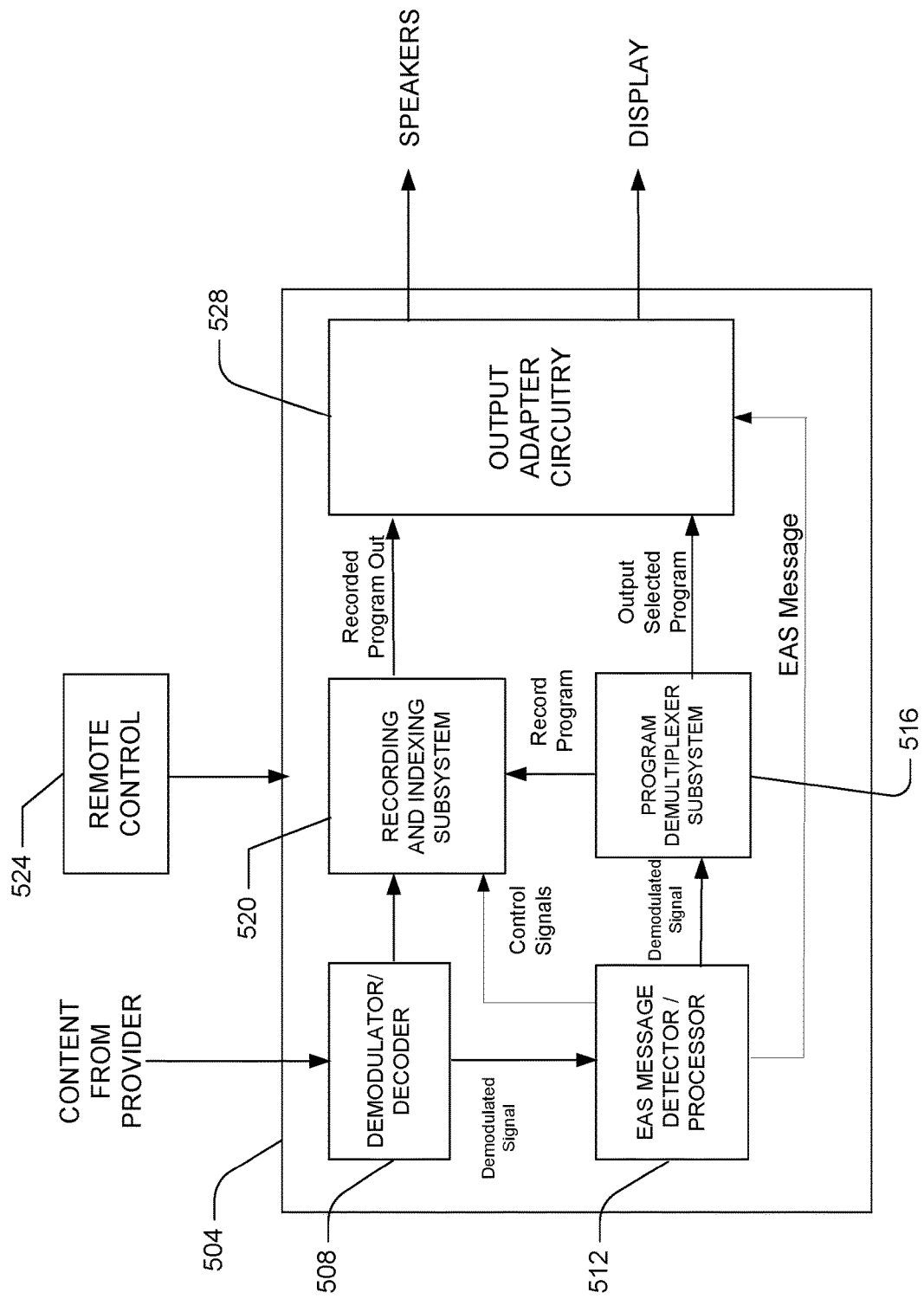

FIG. 5 is a diagram of an example device in which various embodiments may be implemented.

Figure 6:
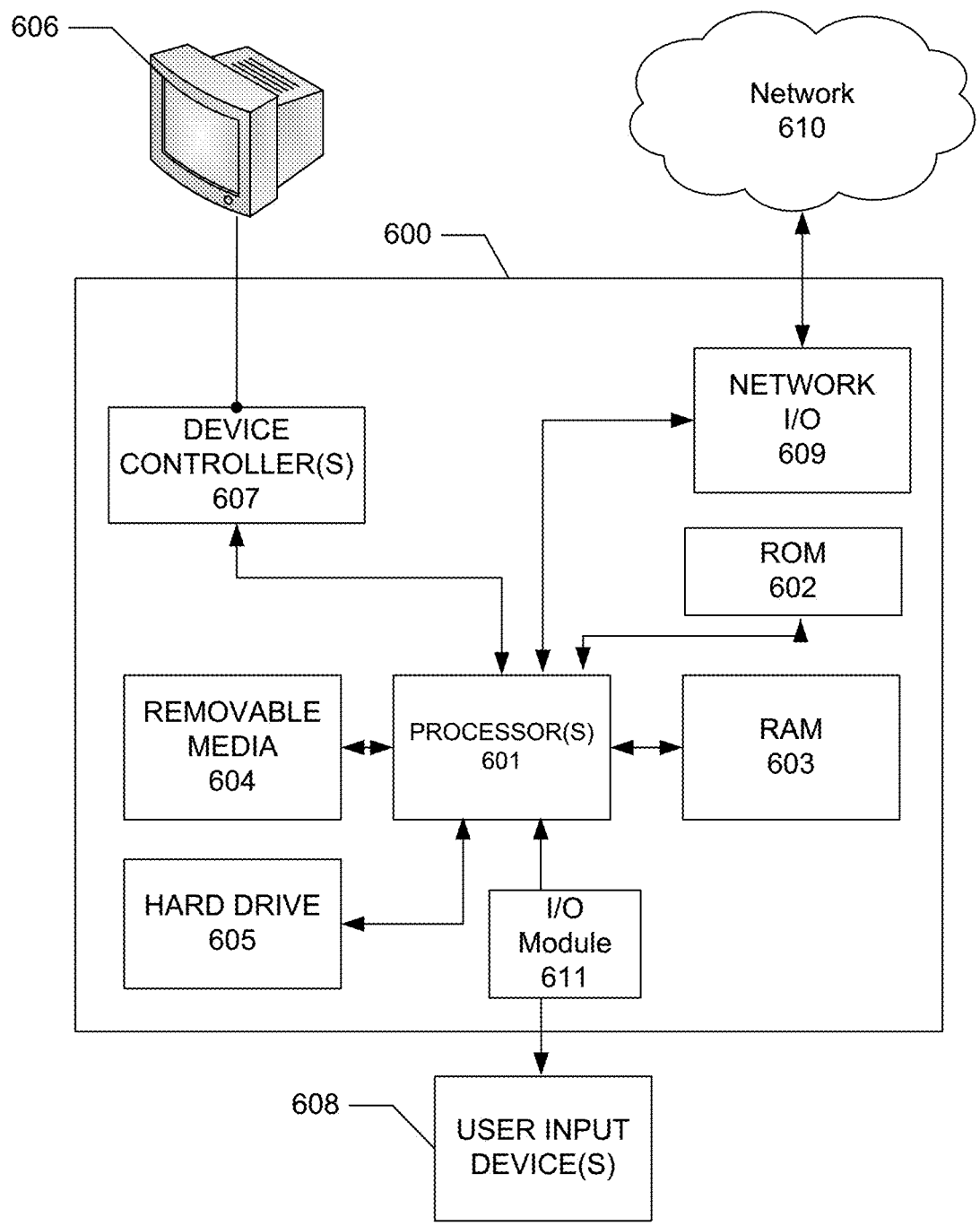

FIG. 6 illustrates general hardware and software elements of a computing device.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

After receiving a high priority communication message, such as an emergency alert system (EAS) message, a user device such as a set top box typically reverts back to the same channel the viewer had been watching immediately before receiving the high priority communication message. Thus, for programs provided by a typical cable channel, the device is able to revert back to the last consumer selected channel after the high priority communication message has been completed. The high priority communication message may comprise any type of emergency message or any type of emergency transmission signal, such as an emergency alert system (EAS) message or a weather, earthquake, or national security related emergency signal/message.

When a viewer selects a video on demand (VOD) program or other non-linear program, the viewer is assigned an available channel which is used to deliver the selected program. The selected program may be assigned to one of one or more usable channels by the network operator based on availability. When a high priority communication message is received by the device while a program is being played to a viewer, the device is forced to tune to the high priority communication message and the streaming program is aborted. The firmware stored in a memory of the user device is responsible for returning the user device to its previous state. However, since the viewer was viewing a program over a channel that was established or assigned by the network operator or other content provider, the device may be unable to revert back to its previous state. Described below are a method, a data processing system or apparatus, and/or a computer program product for resuming playback of a program which was interrupted by such a high priority communication message.

FIG. 1 illustrates an example content delivery system 100 in which various embodiments may be implemented. The system 100 may be owned and/or operated by a cable operator, a satellite operator, Internet service provider, telecommunications carrier, any multiple system operator (MSO), or any type of content provider. The system 100 may comprise a content storage device 104, a high priority communication message server or an emergency alert system (EAS) server 106, a primary server 108, a primary distribution network 112, one or more secondary or regional distribution networks 116, one or more secondary servers 120, one or more backup secondary servers 124, one or more access networks 128, one or more local servers 132, and one or more backup local servers 136.

The content storage device 104 may comprise a data storage repository for storing content such as multimedia programs that may be requested by a viewer or subscriber of a service provided by the content provider. The content storage device 104 may comprise magnetic hard disk drives, optical discs such as CDs and DVDs, and/or other optical media or optical drives, NAS (network attached storage) devices, and/or any combination thereof. The programs stored in the content storage device 104 may comprise any type of linear or non-linear program such as a video on demand (VOD) program. The program may comprise video, audio, or any type of multimedia program such a movies, sporting events, or shows, for example. The content storage device 104 may comprise a cloud storage device that acts as a common storage facility for users who want to record a program for future viewing. The content storage device 104 may function as a virtual digital video recorder. The content storage device 104 may be communicatively coupled to a primary server 108. The primary server 108 may comprise any computing device that incorporates the use of at least one processor and at least one memory for storing software or processor executable instructions. The primary server 108 may comprise random access memory (RAM), non-volatile memory, and an input/output (I/O) module for communicating with other components or elements of the system 100. When the content stored in the content storage device 104 comprises video on demand (VOD) programs, the primary server 108 may function as a video on demand (VOD) content server, for example. When users or viewers share the use of the content storage device 104 to record their favorite programs, the content storage device 104 may function as a shared digital video recorder (DVR) server.

The primary server 108 may provide controlled access to content stored in the content storage device 104. The primary server 108 may also control, allocate, and assign an available communications channel to a user device 140 in order to deliver or download a program, such as a requested VOD program. In one embodiment, the primary server 108 may comprise one or more servers used for storing and accessing content from the content storage device 104, signaling between elements of the content delivery system, and/or controlling of delivery of the content to the one or more end user devices 140. For example, the primary server 108 may comprise both a content server and a control server. The content server may store and access content such as VOD programs and user recorded programs from the content storage device 104. The control server may facilitate signaling between elements of the content delivery system, processing of a high priority communication message, and delivery of content to one or more user devices. The content server may be communicatively coupled to the control server. In another embodiment, the primary server 108 may comprise a content delivery module and a control module. The content delivery module may store and access content from the content storage device 104, while the control module may coordinate and control signaling between elements of the content delivery system 100 to facilitate delivery of content to the one or more end user devices 140.

When executed by the at least one processor, the primary server 108 may be operable for processing signals it receives from one or more user devices 140. The signals it receives may be used to pause and to resume delivery of content, such as a video on demand (VOD) program. A first signal transmitted by a user device 140 may indicate the start of a high priority communication message that was received by the user device. As illustrated in FIG. 1, the high priority communication message may be transmitted from the high priority communication message server or EAS server 106 to one or more user devices 140 by way of the primary server 108. The start of the high priority communication message may be determined by identifying the header of the exemplary EAS message, for example. Thus, a user device 140 may transmit the first signal in response to identifying the header of the EAS message. The first signal may be used to pause delivery of the program.

The high priority communication message server or EAS server 106 may transmit the high priority communication message to the primary server 108 which may transmit or distribute the high priority communication message to one or more user devices 140 by way of the primary distribution network 112, secondary or regional distribution networks 116, and/or access networks 128. A second signal received by the primary server 108 from a user device 140 may be used to resume delivery of the content or program. The second signal may signify that an end of a high priority communication message has been encountered by a user device 140. For example, the user device 140 may determine that an end of a high priority communication message has been reached when it detects a digitally encoded end of message marker in the EAS message. After receiving the second signal, the primary server 108 may resume or restore transmission of the program.

Alternatively, the primary server 108 may process the high priority communication message to determine the pause and resume times of content delivered to the one or more user devices 140 when a high priority communication message is received from the high priority communication message server or EAS server 106. The primary server 108 may track and monitor the high priority communication message transmitted to a user device 140 and may pause and resume delivery of content, such as a VOD program, at the start of the high priority communication message and at the end of the high priority communication message, respectively.

User device 140 may comprise a computing device that connects to, or includes, a display for displaying video and/or generating audio. Exemplary user devices 140 may include a set top box (STB), a digital video recorder (DVR), a personal video recorder (PVR), a smart television, a computer (e.g., a laptop or desktop computer), a media player, a mobile phone, a tablet, a smart phone, or other device configured for receiving and demodulating a communications channel. In an exemplary embodiment, the user devices 140 comprise set top boxes providing video on demand (VOD) functionality to a viewer or subscriber. The user device 140 may cause a display to render the received program, or may itself display received content. The one or more user devices 140 may receive content from secondary servers 120, backup secondary servers 124, local servers 132, backup local servers 136, and/or the primary server 108. The use of a particular server may be based on whether its associated content storage device 104, 122, 126, 134, 138 contains an appropriate copy of the program a user requests.

The primary distribution network 112 may include distribution components and may include routers, servers, switches, and hubs for distributing content stored at the content storage device 104. The content stored at the content storage device 104 may be accessed and distributed by way of control provided by the primary server 108. As shown in FIG. 1, the primary distribution network 112 may be communicatively coupled to one or more secondary or regional distribution networks 116. The secondary or regional distribution networks 116 may be communicatively coupled to one or more access networks 128.

Secondary servers 120 and backup secondary servers 124 may be used to provide content to users at a regional level. Each of the secondary servers 120 and backup secondary servers 124 may be communicatively coupled to their content storage devices 122, 126, respectively, for providing content at a regional level using regional distribution points. The backup secondary servers 124 may be operated when the secondary servers 120 are busy, preoccupied, or unavailable, for example.

Secondary distribution networks 116 may include distribution components and may include routers, servers, switches, and hubs for distributing content stored at content storage devices 122, 126. The content stored at content storage devices 122, 126 may be accessed by way of communication with the secondary and backup secondary servers 120, 124.

Local servers 132 and backup local servers 136 may be used to provide content to users at a local level. Each of the local servers 132 and backup local servers 136 may be communicatively coupled to their content storage devices 134, 138, respectively, for providing content at a local level using local distribution points. The backup local servers 136 may be operated when the local servers 132 are busy, preoccupied, or unavailable, for example.

The primary server 108 may control the distribution of content to the one or more content storage devices 104, 122, 126, 134, 138 via transmission through the primary distribution network 112, secondary or regional distribution networks 116, and access networks 128. The primary server 108 may distribute content to one or more content storage devices 122, 126, 134, 138 by way of transmission using the secondary or regional distribution networks 116 and access networks 128. Particular content may be stored regionally or locally in the one or more content storage devices 122, 126, 134, 138 based on demand for a particular program, geographic factors, and demographics data, for example. If a particular media item is requested frequently by a large number of subscribers at a particular geographic area, the primary server 108 may distribute content to the content storage device closest to the geographic area, by way of transmission through the primary distribution network 112, secondary or regional distribution networks 116, and/or access networks 128, for example.

Access networks 128 may include distribution components and may include routers, servers, switches, and hubs for distributing content stored at content storage devices 134, 138. The content stored at the content storage devices 134, 138 may be accessed by way of communication with the local and backup local servers 132, 136. The access networks 128 are communicatively coupled to one or more user devices 140 as illustrated in FIG. 1.

FIG. 2 is a system block diagram of an example content delivery system 200 in which various aspects of the disclosure may be implemented. The content delivery system 200 may comprise content storage devices 204, 222, 226, 234, 238, a high priority communication or EAS server 206, primary server 208, primary distribution network 212, secondary or regional distribution networks 216, secondary and backup secondary servers 220, 224, access networks 228, local and backup local servers 232, 236.

The content storage devices 204, 222, 226, 234, 238, high priority communication message server or EAS server 206, primary server 208, primary distribution network 212, secondary or regional distribution network 216, secondary and backup secondary servers 220, 224, access networks 228 local and backup local servers 232, 236, and user devices 240, illustrated in FIG. 2, may correspond to the content storage devices 104, 122, 126, 134, 138, high priority communication message server or EAS server 106, primary server 108, primary distribution network 112, secondary or regional distribution network 116, secondary and backup secondary servers 120, 124, access networks 128, local and backup local servers 132, 136, and user devices 140, previously described in connection with FIG. 1. System 200 comprises a number of elements previously described in system 100.

In addition, the content delivery system 200 comprises a restore point server 214 that is communicatively coupled to the high priority communication message server or EAS server 206, primary server 208, the primary distribution network 212, and/or secondary or regional distribution networks 216. The restore point server 214 may monitor the occurrence of a high priority communication message, such as an emergency alert system (EAS) message, at the access networks 228, the secondary or regional distribution networks 216, and/or the primary distribution network 212. In one embodiment, the restore point server 214 may receive one or more reporting signals from one or more user devices 240 when one or more high priority communication messages or EAS messages, transmitted from the high priority communication message server or EAS server 206, are received by the one or more user devices 240. The high priority communication message server or EAS server 206 may transmit the one or more high priority communication messages or EAS messages to the one or more user devices 240 by way of the primary server 208, the secondary or regional distribution networks 216, and the access networks 228. The one or more reporting signals may be received by the restore point server 214 by way of transmission via the access networks 228, the secondary or regional distribution networks 216, or primary distribution network 212.

When alerted by the one or more reporting signals, the restore point server 214 may signal the primary server 208, the secondary servers 220, backup secondary servers 224, the local servers 232, and/or the backup local servers 236, to pause delivery of one or more programs. A signal may be transmitted to the appropriate server 208, 220, 224, 232, 236 used to source the program to the user device 240. When the signal is received, one of the one or more of the primary server 208, the secondary servers 220, backup secondary servers 224, the local servers 232, and/or the backup local servers 236 may pause delivery of one or more programs being transmitted to one or more user devices 240. The one of the one or more of the primary server 208, the secondary servers 220, backup secondary servers 224, the local servers 232, and/or the backup local servers 236 may appropriately index the location at which the content or program is paused.

The duration of a high priority communication message may be determined using information contained in the header of the high priority communication message. For example, the duration of each EAS message may be determined using header information from each EAS message. The duration may be used to display the time elapsed or remaining in the EAS message. The time remaining in the EAS message may be provided as a countdown timer to the viewer, for example. The one or more of the primary server 208, the secondary servers 220, backup secondary servers 224, the local servers 232, and/or the backup local servers 236 may resume playback of a program at an indexed location after the high priority communication message or EAS message has ended. The end of an EAS message may be determined, for example, by detecting a digitally encoded end of message marker. The restore point server 214 may be used to reallocate the same communications channel previously used by the user device 240 to download the program before the program was paused. Alternatively, the restore point server 214 may instruct the primary server 208 to control assignment of a new communications channel between the user device 240 and a server in order to transmit the remainder of the program when playback is resumed.

In one embodiment, the restore point server 214 may monitor or track the delivery of the high priority communication message to the one or more user devices 240. When a high priority communication message, such as an EAS message is delivered from the high priority communication message server or EAS server 206, the restore point server 214 may identify the start of the high priority communication message server or EAS message, for example, by identifying a header of the message, to determine when to pause transmission of the program. In addition, the restore point server 214 may determine when to resume transmission of the paused program by identifying the end of the high priority communication message, such as an EAS message, for example, by identifying a digitally encoded end of message marker in the EAS message. The restore point server may process the high priority communication message while the high priority communication message is delivered to the one or more user devices 240. The restore point server may provide one or more signals to the primary server to either pause program transmission or resume program playback.

It is contemplated that the server 208, 220, 224, 232, 236 selected for providing and controlling the delivery of a requested program may be associated with the content storage device 204, 222, 226, 234, 238 that currently stores the program requested by the viewer. Otherwise, if more than one content storage device 204, 222, 226, 234, 238 contains a copy of the requested program, one of the secondary servers 220, backup secondary servers 224, the local servers 232, and/or the backup local servers 236 closest or nearest to the user device 240 associated with the request may be used to control delivery of the requested program, for example. The primary server 208 may be used to select the appropriate server 208, 220, 224, 232, 236 for delivering the remainder of the program.

FIG. 3 is an example operational flow diagram of a method for pausing and resuming delivery of content to a user when a high priority communication) message is received by a user device. The operational flow diagram of FIG. 3 may be implemented, for example, using aspects of the content delivery system described in connection with FIG. 1.

One of a plurality of communications channels may be assigned by the content delivery system to allow for downloading or receiving of the content by a user device. The primary server previously described in connection with FIG. 1 may control the allocation and assignment of a channel of one or more available channels such as a VOD channel. The primary server may assign an available communications channel to the user device at the time a viewer makes a content selection. The content may be served or transmitted by any one of the servers previously described in connection with the content delivery system shown in FIG. 1.

The primary server may be in communication with the secondary or local servers by way of the primary distribution network, secondary or regional distribution networks, or access networks. The primary server may assign a server to deliver the content to the user device based on network conditions and/or the availability of the VOD program in the one or more content storage devices distributed across the content delivery system.

At step 304, a high priority communication, such as an EAS message is received by a user device. The high priority communication message may originate from one of the distribution networks described in connection with FIGS. 1 and 2. The viewer may have already watched a significant portion of a program when a high priority communication message is received by the user device.

Next, at step 308, the user device may detect the start of a high priority communication message or header of the EAS message when the high priority communication message or EAS message is received. The device may comprise firmware stored in a memory, which when executed by a processor of the device, allows detection of the header portion of the EAS message. If the header is located at the start of the EAS message, the time of detection of the header may provide a temporal point at which a program, that is currently being watched, may be paused. In response to detection of the start of the EAS message, a pause signal may be transmitted by the user device to a server such as the primary server, the secondary server, or the local server, as was previously described in connection with FIG. 1. The pause signal may be directed to the server that was initially responsible for delivering or serving the program to the user's device. The header or start of the high priority communication message may also contain the duration of the EAS message. Alternatively, the primary server may process the high priority communication message or EAS message it receives to determine the pause and resume times of content delivered to the user device.

Next, at step 312, the primary server pauses the transmission of the program in response to receiving the signal. The primary server may mark or index the location of the program to determine the point within the program to resume playback of the program, e.g., the end of the first portion of the program already viewed by the viewer. The marked or indexed program may be stored in its corresponding content storage device for future use. If the primary server was not responsible for delivering the program, the primary server may control content delivery using any one of the secondary servers, backup secondary servers, the local servers, and/or the backup local servers responsible for delivery of the program. The primary server may be used to initiate or facilitate pausing, marking, and indexing of the program at any one of the secondary servers, backup secondary servers, the local servers, and/or the backup local servers.

At step 316, while receiving the high priority communication message, such as an EAS message, the user device may process the EAS message header and detect the duration of the EAS message. The duration may be used to display the elapsed time or remaining time of the EAS message. Optionally, as a convenience to the viewer, the time that remains in the delivery of the EAS message may be displayed as a countdown timer to the viewer, for example. The duration may also be used by the content delivery system to determine when to resume playback of the program. The end of an EAS message may be determined by detecting a digitally encoded end of message marker.

Thereafter, at step 320, upon completion of the high priority communication message, such as an EAS message, the user device may generate and transmit a resume signal to the server that was responsible for the delivery of the first portion of the program. The resume signal may be transmitted to the primary server when the primary server controls delivery of the program. Otherwise, the resume signal may be transmitted to a server, such as a secondary or local server, to provide delivery of the second portion or remainder of the program. Next, at step 324, the remainder of the program is delivered by the assigned server starting from the indexed location. The remainder of the program may be transmitted using the same communications channel before the program was paused. In order to insure delivery of the remainder of the program, the primary server may reserve the communications channel that was used for delivering the program before the program was paused. An alternate communications channel may be assigned by the primary server to deliver the remainder of the program if the previously used communications channel is unavailable. Selection of the alternate communications channel may be based on network conditions. The remainder of the program is received by the user device for viewing by the program requester.

FIG. 4 is an example operational flow diagram of a method for pausing and resuming delivery of content to a subscriber when a high priority communication message is received by a user device in accordance with various embodiments. The operational flow diagram of FIG. 4 may be implemented, for example, using aspects of the content delivery system described in connection with FIG. 2.

One of a plurality of communications channels may be assigned by the content delivery system to allow for downloading or receiving of the program by a user device. The primary server previously described in connection with FIG. 2 may control the allocation and assignment of a channel of one or more available channels. The primary server may assign an available communications channel to the user device at the time a viewer makes a program selection. The program may be served or transmitted by any one of the servers previously described in connection with the content delivery system shown in FIG. 2.

At step 404, the restore point server, as previously described in connection with FIG. 2, receives an indication that a high priority communication message, such as an EAS message, has been transmitted by an EAS broadcasting station or received by a user device. The indication may comprise a signal transmitted by the EAS server previously described in connection with FIGS. 1 and 2, an EAS broadcasting station, or a signal transmitted by one or more user devices in response to receiving an EAS message. The signal transmitted by the one or more user devices may comprise a pause signal as was previously described in connection with FIG. 3. Alternatively, the restore point server may receive and process the EAS message while the EAS message is delivered to the user device. The restore point server may transmit a pause signal to the primary server after identifying the start of the EAS message.

Next, at step 408, the restore point server may determine, based on the information provided by the signal, the users in each of one or more geographic regions that are affected by the high priority communication message or the EAS message. The term "region" may be defined as any grouping of user devices and may not limited to a geographic region. The geographic information may be determined from data located in the header of an EAS message, for example. The geographic information may be supplied by the signal the restore point server receives from the EAS broadcasting station. Otherwise, the geographic information may be supplied by the signal transmitted by the user device. The restore point server may correlate the affected geographic region to a database containing viewer addresses or other user information. The restore point server may monitor current requests of those viewers in the affected geographic region.

At step 412, the restore point server may initiate pausing of programs being watched in the affected geographic region. The restore point server may signal one or more servers that are currently providing one or more programs to users located in the affected geographic region. Each of the one or more servers associated with one or more programs being viewed in the affected geographic region may pause transmission and index the location of the one or more programs currently being viewed by one or more users.

Next, at step 416, the restore point server and affected servers may determine the resume time based on the duration of the EAS message. The restore point server may receive and process the high priority communication message, such as the EAS message while the EAS message is delivered to one or more user devices. The restore point server may transmit a resume signal to the primary server after identifying the end of the EAS message. The duration of the EAS message may be obtained from the header of the EAS message. The header of an incoming EAS message may be processed and the duration may be used to compute the time in which the EAS message ends. The processing and computing of the EAS message end time may be performed at the restore point server and/or the one or more user devices. The duration may be used to display the elapsed time or remaining time of the EAS message. Optionally, as a convenience to the viewer, the time that remains in the delivery of the EAS message may be displayed as a countdown timer to the viewer, for example. The duration may also be used by the content delivery system to determine when to resume playback of the one or more multimedia or programs. The end of an EAS message may be determined by detecting a digitally encoded end of message marker.

Thereafter, at step 420, upon completion of the high priority communication message, such as the EAS message, the restore point server or other network computing devices may initiate resumption of playback of the program. In one embodiment, upon completion of the high priority communication message or EAS message, the one or more user devices may generate and transmit a resume signal to the server that was responsible for the delivery of the first portion of the program. After receiving the resume signal, the restore point server or any other of one or more network computing devices located in the primary distribution network, secondary or regional distribution networks, and/or access networks may signal one or more servers that paused transmission of one or more programs to resume playback of the one or more programs at their respective indexed locations. Each of the one or more servers associated with a program being viewed in the affected geographic region may be directed by the restore point server or any other of the one or more network computing devices to continue or resume playback of the program from the indexed location. In another embodiment, the restore point server or any other of the one or more network computing devices may determine when to signal the one or more servers to resume transmission at the indexed locations of one or more programs based on the duration of the high priority communication message or EAS message. In an alternate embodiment, the restore point server or any other of the one or more network computing devices may determine when to resume transmission of the one or more programs based on the end of message marker of the received high priority communication message or EAS message. The restore point server or any other of the one or more network computing devices may signal one or more affected servers to continue playback of the one or more programs at their respective indexed locations.

Next, at step 424, the remaining portions of one or more programs are delivered to the affected viewers starting from the indexed locations. The remainder of the program may be transmitted using the same communications channel before the program was paused. In order to insure delivery of the remainder of the program, the primary server may reserve the communications channel that was used for delivering the program before the program was paused. An alternate communications channel may be assigned by the primary server and/or restore point server to deliver the remainder of the program if the previously used communications channel is unavailable. Selection of the alternate communications channel may be based on network conditions. The remainder of the program is received by the user device for viewing by the program requester.

FIG. 5 is a system block diagram of an example user device 504 in which various embodiments may be implemented. In one embodiment, the user device 504 may comprise a digital video recorder (DVR) or personal video recorder (PVR). The user device 504 may comprise a demodulator/decoder 508 for demodulating and/or decoding a signal from a content provider (e.g., a cable, satellite, wireless, or Internet provider). The demodulator/decoder 508 may output the demodulated/decoded signal to an EAS message detector/processor 512 and a recording and indexing subsystem 520.

The recording and indexing subsystem 520 may comprise a data storage device for storing recorded programs. The recording and indexing subsystem 520 may be used to record content, such as one or more programs selected by viewer, into the data storage device. A remote control 524 may be communicatively coupled to the user device 504 and may be used to control the recording and indexing subsystem 520 and to select a program using the program demultiplexer subsystem 516. The program may be demultiplexed and transmitted to the recording and indexing subsystem 520 by the program demultiplexer subsystem 516. The recording and indexing subsystem 520 may also be used to perform playback of previously recorded programs. The remote control 524 may be used to select and play a previously recorded program. During playback, the previously recorded program may be transmitted from the recording and indexing subsystem 520 to an output adapter circuitry 528 where it is output to a display and speakers for viewing by a viewer.

The EAS message detector/processor 512 may process the demodulated/decoded signal to determine if the demodulated/decoded signal contains a high priority communication message or an EAS message. A high priority communication message, such as an EAS message may be detected, for example, by detecting a header of the high priority communication message or EAS message. When an EAS message is detected, the high priority communication message detector/processor or EAS message detector/processor 512 may transmit a first control signal to the recording and indexing subsystem 520 to pause playback of a previously recorded program being viewed by a viewer. When the EAS message is detected, the high priority communication message detector/processor or EAS message detector 512 may output the EAS message to the output adapter circuitry 528 while the program is paused.

The high priority communication message detector/processor or EAS message detector/processor 512 may detect the end of the EAS message, for example, by detecting a digitally encoded end of message marker. The high priority communication message detector/processor or EAS message detector/processor 512 may, for example, determine the end of an EAS message by obtaining the duration of the EAS message from a header of the EAS message. When the end of the high priority communication message or EAS message is detected, the high priority communication message detector/processor or EAS message detector/processor 512 may transmit a second control signal to the recording and indexing subsystem 520 to resume playback of the program that was previously paused. Thus, after completion of the high priority communication message or EAS message, playback of the program resumes at the location where the program was paused.

In the absence of a high priority communication message or an EAS message, the EAS message detector/processor 512 outputs the demodulated signal to the program demultiplexer subsystem 516 where the demodulated signal is demultiplexed into a plurality of streams. Each of the plurality of streams may comprise any type of program such as a movie, a show, or a sporting event, for example. A program may be recorded by the recording and indexing subsystem 520 or output to the output adapter circuitry 528 for viewing by a viewer. Selection of the program, recording/playing of the program, and/or outputting of the program may be controlled by using the remote control 524.

FIG. 6 illustrates general hardware elements that may be used to implement each of the computing devices, such as the one or more servers and/or user devices, previously described in connection with FIGS. 1-5. The one or more servers may comprise the primary server, the secondary servers, backup secondary servers, the local servers, and/or the backup local servers described in connection with FIGS. 1-5. Each of the one or more servers and/or user devices may include one or more processors 601, which may execute instructions of a computer program to perform any of the features described herein. The instructions may be stored in any type of computer-readable medium or memory, to configure the operation of the processors 601. For example, instructions may be stored in any type of a memory (e.g., solid state flash, disk, etc.) such as read-only memory (ROM) 602, random access memory (RAM) 603, removable media 604, such as a Universal Serial Bus (USB) drive, compact disk (CD) or digital versatile disk (DVD), floppy disk drive, or any other desired electronic storage medium.

Instead of a general-purpose processor, any of various special-purpose processors such as field-programmable gate arrays (FPGAs) or application-specific integrated circuit (ASICs) may be used to implement the functions described herein. Accordingly, the term "processor" should be understood to refer to all of these and other possible implementations.

Instructions may also be stored in an attached (or internal) hard drive 605 or any other type of memory. The computing device 600 may be communicatively coupled to one or more output devices, such as a display 606 (or an external television), and may include one or more output device controllers 607, such as a video processor. The computing device 600 may include an input/output (I/O) module 611 that is communicatively coupled one or more user input devices 608, such as a remote control, mouse, keypad, keyboard, touch screen, scanner, microphone, optical reader, infrared communication device, Bluetooth communication device, Wi-Fi communication device, near field communication (NFC) device, and/or other input devices through which a user may provide input, and may also include and/or interface with one or more speakers for providing audio output and a video display device for providing textual, audiovisual, and/or graphical output. The computing device 600 may also include one or more network interfaces, such as network input/output circuits 609 (such as a network card) to communicate with an external network 610. The network interface may be a wired interface, wireless interface, or a combination of the two. In some embodiments, the network interface may include a modem (e.g., a cable modem), and network 610 may correspond to any one of the one or more networks described in connection with FIGS. 1-4, such as the primary distribution network, secondary or regional distribution networks, and/or access networks. The one or more networks may comprise a content provider's wireline and/or wireless network, coaxial, fiber, or hybrid fiber/coaxial distribution system (e.g., a DOCSIS network), or any other desired network.

Although not required, one of ordinary skill in the art will appreciate that the various aspects described herein may be embodied as a method, a computer system, or as a computer-readable storage media for storing software or a computer program comprising computer-executable instructions that are capable of being executed by at least one processor of a computer system. Aspects of the invention have been described in terms of illustrative embodiments thereof. Numerous other embodiments, modifications, and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure. While some embodiments have been described with respect to specific examples, other embodiments include numerous variations and permutations of the above described systems and techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A system comprising:
  a first computing device configured to receive content; and
  a second computing device comprising:
    one or more processors; and
    memory storing executable instructions that, when executed by the one or more processors, cause the second computing device to:
      receive, from the first computing device, a first signal that indicates that the first computing device has started to receive a high priority communication message;
      determine, from a plurality of servers, a first server that is sending the content to the first computing device;
      send, to the first server, a second signal to cause the first server to, for the first computing device, pause sending of the content to the first computing device at a location in the content;
      determine, based on an indication that the first computing device has completed processing of the high priority communication message, to resume sending of the content to the first computing device; and
      based on determining to resume sending of the content to the first computing device, send, to a second server of the plurality of servers, a third signal to cause the second server to, for the first computing device, resume sending of the content to the first computing device from the location in the content.

2. The system of claim 1, further comprising the plurality of servers;
  wherein the first server is configured to send, to the first computing device via a communication channel, a first portion of the content; and
  wherein the second server is configured to send, to the first computing device via the communication channel, a second portion of the content.

3. The system of claim 1, wherein the high priority communication message comprises an emergency alert system (EAS) message.

4. The system of claim 3, wherein a header of the EAS message comprises an indication of a duration;
  wherein the executable instructions, when executed by the one or more processors, cause the second computing device to:
    process the EAS message to determine the duration; and
    determine, based on the duration of the EAS message, the indication that the first computing device has completed processing of the high priority communication message.

5. The system of claim 1, further comprising the first server;
  wherein the first server is configured to retrieve, from a shared digital video recorder that stores shared content for a plurality of users, the content, wherein one of the plurality of users is associated with the first computing device.

6. The system of claim 1, wherein the executable instructions, when executed by the one or more processors, cause the second computing device to:
  send, to a third server of the plurality of servers, a fourth signal to cause the third server to, for another computing device, pause sending of the content to the other computing device.

7. The system of claim 1, wherein the first computing device comprises a set top box;
  wherein the plurality of servers is associated with a content provider;

wherein the system further comprises the plurality of servers;

wherein the first server is configured to send the content to the first computing device via a distribution network of the content provider; and wherein the second server is configured to send the content to the first computing device via an access network of the content provider.

8. An apparatus comprising:

one or more processors; and memory storing executable instructions that, when executed by the one or more processors, cause the apparatus to:
based on receiving, from a user device based on the user device having started to receive a high priority communication message, a first signal that indicates that content being sent to the user device is to be paused, determine, from a plurality of servers, a first server that is sending the content to the user device;
determine a geographic region affected by the high priority communication message;
send, to the plurality of servers, a second signal to cause the plurality of servers to, for a plurality of user devices within the geographic region, pause sending of the content to the plurality of user devices at a location in the content;
determine, based on an indication that the plurality of user devices within the geographic region have completed processing of the high priority communication message, to resume sending of the content to the plurality of user devices within the geographic region; and
based on determining to resume sending of the content to the plurality of user devices within the geographic region, send, to the plurality of servers, a third signal to cause the plurality of servers to, for the plurality of user devices within the geographic region, resume sending of the content to the plurality of user devices from the location in the content.

9. The apparatus of claim 8, wherein the first server, prior to pausing the sending of the content, is sending a first portion of the content to the user device via a communication channel; and wherein a second server of the plurality of servers, after resuming the sending of the content, is sending a second portion of the content to the user device via the communication channel.

10. The apparatus of claim 8, wherein the first server, prior to pausing the sending of the content, is sending a first portion of the content to the user device via a first communication channel; and wherein a second server of the plurality of servers, after resuming the sending of the content, is sending a second portion of the content to the user device via a second communication channel different from the first communication channel.

11. The apparatus of claim 8, wherein the high priority communication message comprises an emergency alert system (EAS) message, and wherein the executable instructions, when executed, cause the apparatus to:
process the EAS message to determine a duration of the EAS message; and
determine, based on the duration of the EAS message, the indication that the user device has completed processing of the high priority communication message.

12. The apparatus of claim 11, wherein a header of the EAS message comprises an indication of the duration of the EAS message.

13. The apparatus of claim 8, wherein the content is stored in a shared digital video recorder that stores shared content for a plurality of users, wherein one of the plurality of users is associated with the user device.

14. The apparatus of claim 8, wherein the second signal causes the first server to send, to the plurality of servers, an indication of the location in the content.

15. An apparatus comprising:

one or more processors; and memory storing executable instructions that, when executed by the one or more processors, cause the apparatus to:
based on receiving, from a user device based on the user device having started to receive a high priority communication message, a first signal that indicates that content being sent to the user device is to be paused, determine, from a plurality of servers, a first server that is sending the content to the user device;
send, to the first server, a second signal to cause the first server to, for the user device, pause sending of the content at a location in the content;
determine, based on an indication that the user device has completed processing of the high priority communication message, to resume sending of the content to the user device; and
based on determining to resume sending of the content to the user device, send, to a second server of the plurality of servers, a third signal to cause the second server to, for the user device and based on the location in the content, resume sending of the content to the user device.

16. The apparatus of claim 15, wherein the first server, prior to pausing the sending of the content, is sending a first portion of the content to the user device via a communication channel; and wherein the second server, after resuming the sending of the content, is sending a second portion of the content to the user device via the communication channel.

17. The apparatus of claim 15, wherein the first server, prior to pausing the sending of the content, is sending a first portion of the content to the user device via a first communication channel, and wherein the second server, after resuming the sending of the content, is sending a second portion of the content to the user device via a second communication channel different from the first communication channel.

18. The apparatus of claim 15, wherein the high priority communication message comprises an emergency alert system (EAS) message, and wherein the executable instructions, when executed, cause the apparatus to:
process the EAS message to determine a duration of the EAS message; and
determine, based on the duration of the EAS message, the indication that the user device has completed processing of the high priority communication message.

19. The apparatus of claim 15, wherein the second signal causes the first server to send, to the second server, an indication of the location in the content.

20. The apparatus of claim 15, wherein the executable instructions, when executed, cause the apparatus to:
determine a geographic region affected by the high priority communication message;
cause, based on sending of the second signal, the plurality of servers to, for a plurality of user devices within the geographic region, pause sending of the content to the plurality of user devices; and cause, based on sending of the third signal, the plurality of servers to, for the plurality of user devices, resume sending of the content to the plurality of user devices.

* * * * *

UNITED STATES PATENT AND TRADEMARK OFFICE
CERTIFICATE OF CORRECTION

PATENT NO. : 10,638,204 B2
APPLICATION NO. : 16/434447
DATED : April 28, 2020
INVENTOR(S) : Amit Garg It is certified that error appears in the above-identified patent and that said Letters Patent is hereby corrected as shown below:

In the Specification

Column 7, Detailed Description, Line 63:
Please delete "communication)" and insert --communication--

Column 12, Detailed Description, Line 11:
Please delete "detector" and insert --detector/processor--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*